(12) United States Patent
Anantharaman (10) Patent No.: US 8,263,244 B2
(45) Date of Patent: Sep. 11, 2012

(54) ISOLATION TRAY FOR A BATTERY SYSTEM (75) Inventor: Satish Anantharaman, Farmington Hills, MI (US)

(73) Assignee: Cobasys, LLC, Orion, MI (US)

( * ) Notice: Subject to any disclaimer, the term of this patent is extended or adjusted under 35 U.S.C. 154(b) by 698 days.

(21) Appl. No.: 12/425,726

(22) Filed: Apr. 17, 2009

(65) Prior Publication Data

US 2009/0263705 A1 Oct. 22, 2009

Related U.S. Application Data (60) Provisional application No. 61/127,838, filed on May 15, 2008, provisional application No. 61/046,086, filed on Apr. 18, 2008.

(51) Int. Cl.
*H01M 2/02* (2006.01)
*H01M 2/36* (2006.01)

(52) U.S. Cl. .................. 429/72; 429/90; 429/91; 429/92
(58) Field of Classification Search ........................ None
See application file for complete search history.

(56) References Cited

U.S. PATENT DOCUMENTS

| 2002/0076604 | A1* | 6/2002 | Matsuoka et al. | 429/53 |
| 2003/0008204 | A1* | 1/2003 | Winter et al. | 429/81 |
| 2007/0190403 | A1* | 8/2007 | Wang | 429/63 |

* cited by examiner

*Primary Examiner* — Patrick Ryan
*Assistant Examiner* — Wyatt McConnell
(74) *Attorney, Agent, or Firm* — Harness, Dickey & Pierce, P.L.C.

(57) ABSTRACT

A battery assembly includes a housing and N charge storage devices within the housing. The system also includes a first tray includes a first side that includes X areas that transfer first current from electrolyte leaked from a first one of the N charge storage devices to a current detector. The tray includes a second side that insulates the housing from the electrolyte. N and X are integers greater than or equal to 1.

21 Claims, 7 Drawing Sheets

ISOLATION TRAY FOR A BATTERY SYSTEM

CROSS-REFERENCE TO RELATED APPLICATIONS

This application claims the benefit of U.S. Provisional Application No. 61/127,838, filed on May 15, 2008 and U.S. Provisional Application No. 61/046,086, filed on Apr. 18, 2008. The disclosures of the above applications are incorporated herein by reference in its entirety.

FIELD

The present disclosure relates to battery assemblies, and more particularly to electrolyte management systems for battery assemblies.

BACKGROUND

Battery systems may be used to provide power in a wide variety of applications. Exemplary transportation applications include hybrid electric vehicles (HEV), electric vehicles (EV), heavy duty vehicles (HDV), vehicles with 42-volt electrical systems or any vehicle using an auxiliary battery system. Exemplary stationary applications include backup power for telecommunications systems, uninterruptible power supplies (UPS), and distributed power generation applications.

Examples of the types of batteries that are used include nickel metal hydride (NiMH) batteries, Lithium-ion (Li) batteries, lead-acid batteries, and other types of batteries. A battery system may include a plurality of battery subpacks that are connected in series and/or in parallel. The battery subpacks may include a plurality of battery cells that are connected in parallel and/or in series. Each of the battery cells may include a plurality of batteries that are also connected in parallel and/or series.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

A battery assembly includes a housing and N charge storage devices within the housing. The system also includes a first tray that includes a first side that includes X areas that transfer first current from electrolyte leaked along the surface of a first one of the N charge storage devices to a current detector. The tray includes a second side that insulates the housing from the electrolyte. N and X are integers greater than or equal to 1.

In other features, the housing includes a conductive L-band that communicates with the X areas and the current detector. A portion of the first side is folded over a portion of the second side. The L-band communicates with the portion of the first side. $X \geq N$, and X and N are greater than 1. The system also includes a second tray that includes a third side that includes Y areas that transfer the first current from electrolyte leaked from the N charge storage devices to the current detector, and a fourth side that insulates the housing from the electrolyte. Y is an integer greater than or equal to 1.

In other features, the first side includes at least one of a conductive material and a semi-conductive material. The first side also includes a first polymeric or composite material and the second side includes a second polymeric or composite material that has a higher resistance than the first polymeric or composite material. A first of the X areas dissipates the first current from the electrolyte from the first of the N charge storage devices over a surface area of the first of the X areas. A second of the X areas dissipates second current from electrolyte leaked from a second of the N charge storage devices over a surface area of the second of the X areas.

In other features, the first side substantially insulates the first current from the second current. The first side includes a first trough that collects the electrolyte leaked from a first of the N charge storage devices and a second trough that collects the electrolyte leaked from a second of the N charge storage devices. The housing includes a first end plate, a second end plate and straps that connect the first end plate to the second end plate. The first tray is positioned adjacent to the straps. The first end plate, the second end plate and the straps are electrically conductive.

In other features, the system includes a first insulating plate positioned between the first end plate and the N charge storage devices and a second insulating plate positioned between the second end plate and the N charge storage devices. The first side of the first tray includes a base material that is at least one of impregnated with a semiconductor material and coated with a semiconductor material.

In other features, a battery assembly includes a plurality of battery subpacks that communicate in at least one of series and parallel. Each of the battery subpacks includes a housing. The battery subpacks also include N charge storage devices within the housing. The battery subpacks also include a first tray that includes a first side that includes X areas that transfer first current from electrolyte leaked from a first one of the N charge storage devices. The first tray also includes a second side that insulates the housing from the electrolyte. N and X are integers greater than or equal to 1. The system also includes at least one current detector that generates detection signals based on the first current.

In other features, the system includes a control module that selectively controls each of the plurality of battery subpacks based on the detection signals. At least one of the housings includes a conductive L-band that communicates with the X areas and the at least one current detector. A portion of the first side is folded over a portion of the second side. The L-band communicates with the portion of the first side. A first of the X areas dissipates the first current from the electrolyte from the first of the N charge storage devices over a surface area of the first of the X areas. A second of the X areas dissipates second current from electrolyte leaked from a second of the N charge storage devices over a surface area of the second of the X areas. The first side substantially insulates the first current from the second current.

In other features, each of the housings comprise a first end plate, a second end plate and straps that connect the first end plate to the second end plate. The first tray is positioned adjacent to the straps. The first end plate, the second end plate and the straps are electrically conductive. Each battery subpack further includes a first insulating plate positioned between the first end plate and the N charge storage devices and a second insulating plate positioned between the second end plate and the N charge storage devices. The first side of the first tray includes a base material that is at least one of impregnated with a semiconductor material and coated with a semiconductor material.

Further areas of applicability of the present invention will become apparent from the detailed description provided hereinafter. It should be understood that the detailed description and specific examples, while indicating the preferred embodiment of the disclosure, are intended for purposes of illustration only and are not intended to limit the scope of the invention.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Multiple leaks of electrolyte in a battery system may cause short circuits because electrolyte from a first leak may contact electrolyte from a second leak. This contact may cause a rapid discharge of the battery system, which may be undesirable. Also, the contact may cause electrical current to flow through various metal parts of the battery system, such as metal bands and end plates. The present disclosure reduces effects of electrolyte leakage and/or provides a controlled discharge for a battery subpack of the battery system.

Figure 1:
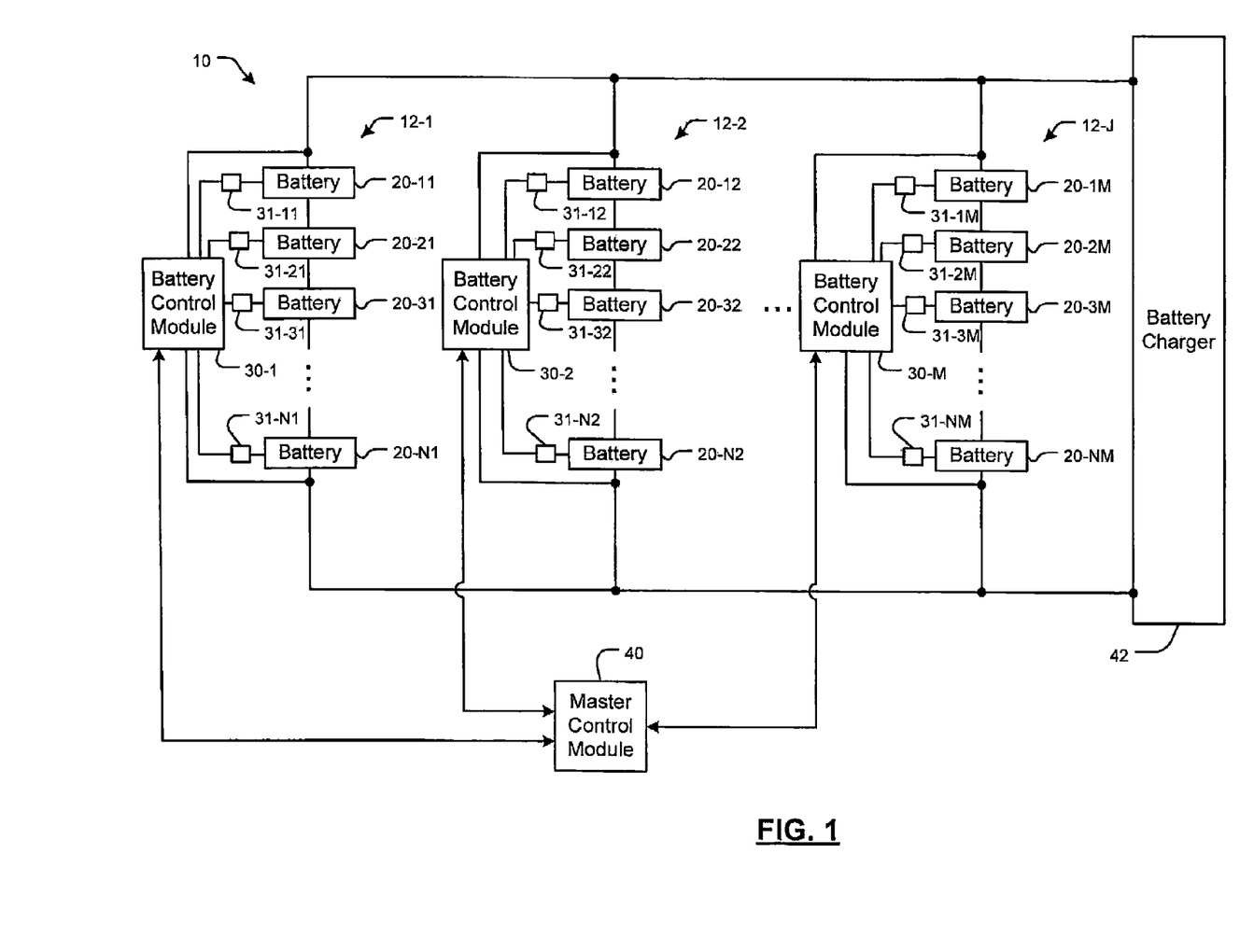
FIG. 1 is a schematic diagram of a battery system according to the present disclosure.

Referring now to FIG. 1, an exemplary embodiment of a battery system 10 is shown to include J battery subpacks 12-1, 12-2, . . . , and 12-J (collectively referred to as battery subpacks 12). The battery subpacks 12 include charge storage devices, for example, N series connected battery cells 20-11, 20-12, . . . , and 20-NM (collectively referred to as battery cells 20) are shown. The battery cells 20 may include, for example, nickel-metal hydride (NiMH) batteries Lithium-ion (Li-ion) batteries and/or other charge storage devices, such as capacitors. Battery control modules 30-1, 30-2, . . . , and 30-M (collectively referred to as battery control modules 30) are associated with each of the battery subpacks 12, respectively.

The battery control modules 30 may receive signals from detectors 31-11, 31-12, . . . , and 31-NM (collectively referred to as detectors 31) that each communicate with respective battery cells 20. The battery control modules 30 may determine leakage based on detector signals.

The battery control modules 30 may also sense voltage across and current provided by the battery subpacks 12 and may selectively shut-off battery packs and/or individual cells 20 based on sensed voltage. The battery control modules 30 may monitor one or more individual battery cells 20 in battery subpacks 12 and perform appropriate scaling and/or adjustments. Battery control modules 30 may communicate with a master control module 40 using wireless and/or wired connections. The master control module 40 may receive battery data from the battery control modules 30 and generate data, such as maximum and minimum power, for the battery subpack 12. In some embodiments the battery control modules 30 and the master control module 40 can be combined. A battery charger 42 may communicate with terminals of the battery system 10 and generate a charging current.

Figure 2A:
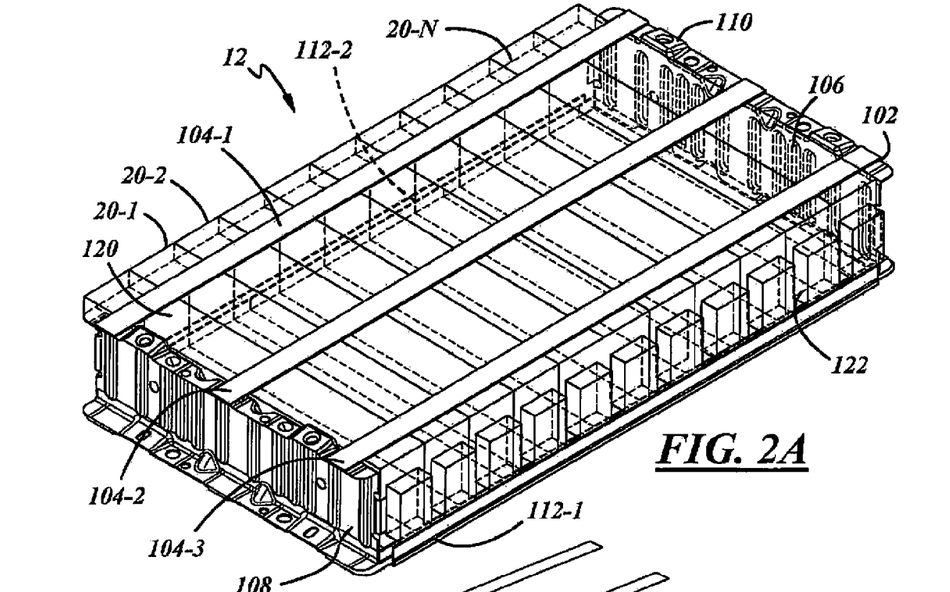
FIG. 2A is a perspective view of a battery assembly according to the present disclosure.
Figure 2B:
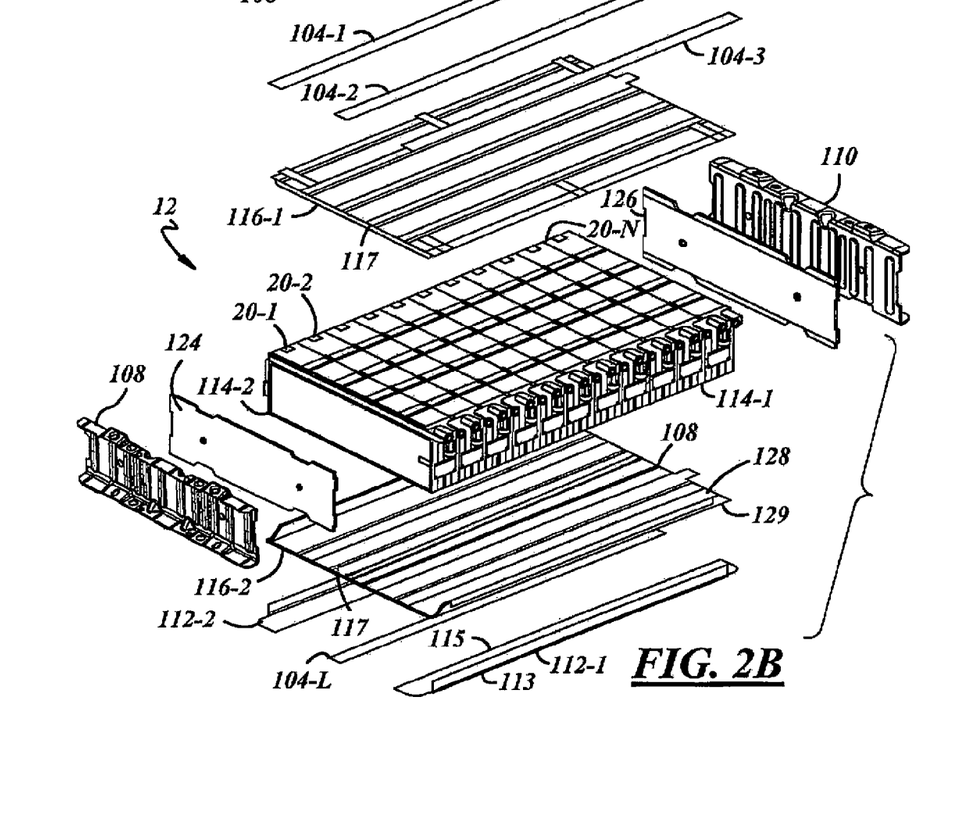
FIG. 2B is a partially exploded perspective view of the battery assembly according to the present disclosure.

Referring now to FIGS. 2A-2B, an exemplary assembly for a battery subpack 12 is shown. The subpack 12 may include a housing assembly 102 containing a plurality of battery cells 20 therein. The housing assembly 102 may include a plurality of straps 104-1, 104-2, . . . , and 104-L (collectively referred to as straps 104). The straps 104 may couple to front and rear endplates 108, 110. The housing assembly 102 may also include L-bands 112-1, 112-2 (collectively referred to as L-bands 112) that fit along edges of the battery cells 20 and that may couple to the endplates 108, 110. The L-bands 112 may include two adjacent sides 113, 115 connected such that a cross-section of the L-bands generally resembles the letter "L". Although two L-bands 112 are shown to fit along two of the bottom edges 114-1, 114-2 of the battery cells 20, further L-bands may also be included along any other edges of the battery cells 20. The L-bands 112 may serve to bracket the battery cells 20 together.

Upper and lower trays 116-1, 116-2 (collectively referred to as trays 116) may be positioned between the straps 104 and L-bands 112 of the housing assembly 102 and the battery cells 20. Front and rear insulating plates 124, 126 may be positioned between the endplates 108, 110 of the housing assembly 102 and the battery cells 20. The trays 116 may be sized based on dimensions of the battery cells 20 so that all of the battery cells 20 may fit between the trays 116. The trays 116 may include troughs 117 that may serve to dissipate heat and/or to collect electrolyte leaked from the battery cells 20. Previously, electrolyte from multiple leaking battery cells 20 had a tendency to short together. Electrolytic shorts either rapidly discharged the battery subpack 12 and/or caused current from the battery subpack 12 to flow through portions of the housing assembly 102. The present disclosure substantially isolates the battery cells 20 via the trays 116.

One or more of the trays 116 may also electrically communicate at one or more points with one or more portions of the housing assembly 102, such as with the L-bands 112, the endplates 108, 110, the straps 104, and/or through clips that clip together portions of the housing assembly 102. The multiple communication points may collectively provide a reference voltage potential, such as ground. The trays 116 may include electrically insulative materials that may be selected based on chemical resistance properties, wear resistance, temperature resistance, extrusion and thermo-forming characteristics. Exemplary insulative materials include plastics, such as, but not limited to polyethylene (PE) and polypropylene (PP) or any polymeric or composite material. The trays 116 may include insulative material that has sufficient dielectric strength (for example greater than 600 V/mm) so that arcing may be reduced or eliminated between subpacks and/or battery cells 20.

Figure 3A:
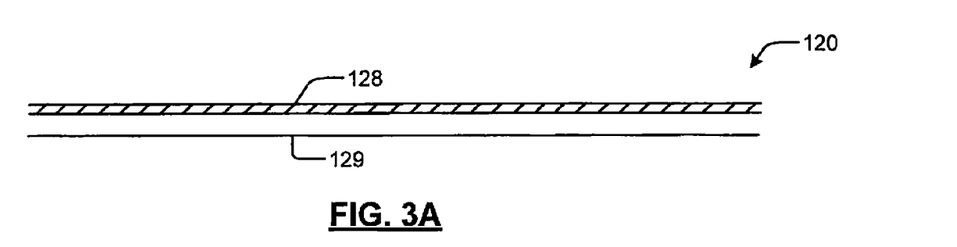
FIGS. 3A-3D are cross-sectional views of a battery tray according to the present disclosure.

Referring now to FIG. 3A, in one embodiment, the trays 116 may include an electrically conductive and/or semi-conductive layer 128 on a first side that may be adjacent to and that may or may not contact the battery cells 20. The layer 128 may provide current to the detector 31 and may also dissipate current over the surface area of the layer 128. The trays 116 may also include an electrically insulative layer 129 on a second side. The layer 128 may communicate with the housing assembly 102 at multiple points, such as with the L-bands 112, the endplates 108, 110, the straps 104 and/or through clips 131-1, 131-2, such as C-clips that clip the layers 128, 129 together. Both layers 128, 129 may include plastic and/or ceramic materials. However, resistance of materials included in the conductive and/or semi-conductive layer 128 may be less than resistances of materials used in the electrically insulative layer 129.

The trays 116 may also include one or more electrically conductive layers adhered to an electrically insulative layer, thereby forming an electrically isolative multi-layer film. The film may prevent the flow of electrolyte away from a contained area, such as one of the troughs 117. An example of a conductive layer includes carbon black. The electrically insulative layer 129 may provide an electrically insulative barrier between the layer 128 and other electrically conductive parts within the battery system 10. The layers 128, 129 may be bonded together via adhesive, heat and/or pressure. For example, the layers 128, 129 may be laminated together.

Figure 3B:
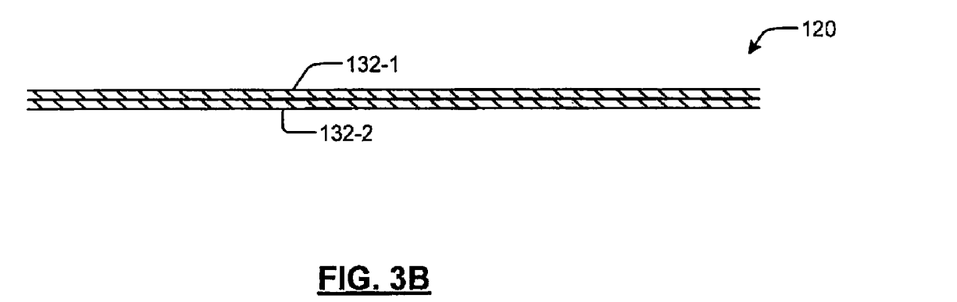
Figure 3C:
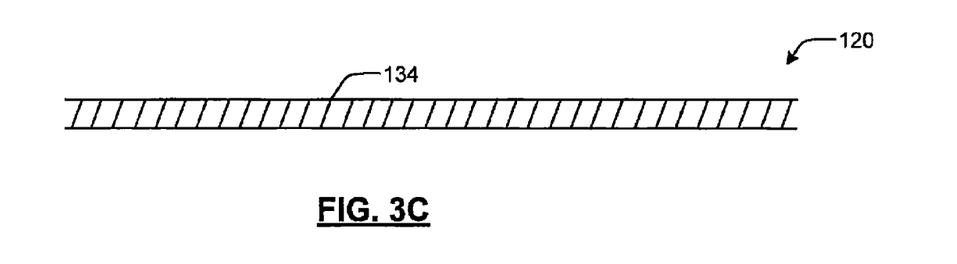
Figure 3D:
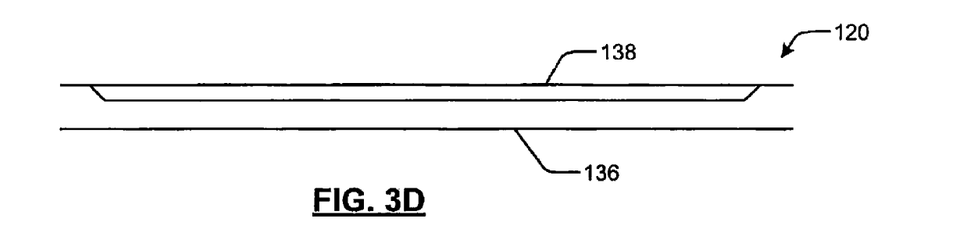

Referring now to FIGS. 3B-3D, in another embodiment, the trays 116 may include a semi-conductive coating. The semi-conductive coating may include one or more layers, for example, two layers 132-1, 132-2 are shown. The layers may include similar characteristics or may include differing characteristics. The layers may also include polymeric or composite plastics or resins that may withstand heat associated with electrical current of the battery system 10. In FIG. 3C, in another embodiment, the trays 116 may each include a single resistive sheet 134 without multiple layers. In FIG. 3D, the trays 116 may include a base material 136 impregnated or coated with semiconductor materials 138.

The detectors 31 may detect leakage or loss of electrical isolation between the battery cells 20 via communicating with the trays 116. The conductive/semi-conductive layer 128 provides current to the detector 31 and further dissipates the current over the surface area of the layer 128. The layer 128 therefore prevents rapid discharge of cells 20 by dissipating current from the electrolyte and inhibiting the electrolyte from contacting or arcing with other electrolyte leaked elsewhere in the battery subpack 12.

Figure 4A:
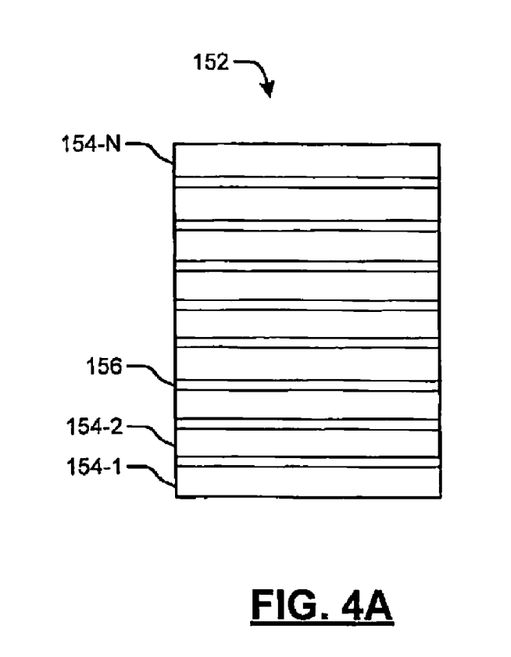
FIGS. 4A-4C are top views of a battery tray according to the present disclosure.
Figure 4B:
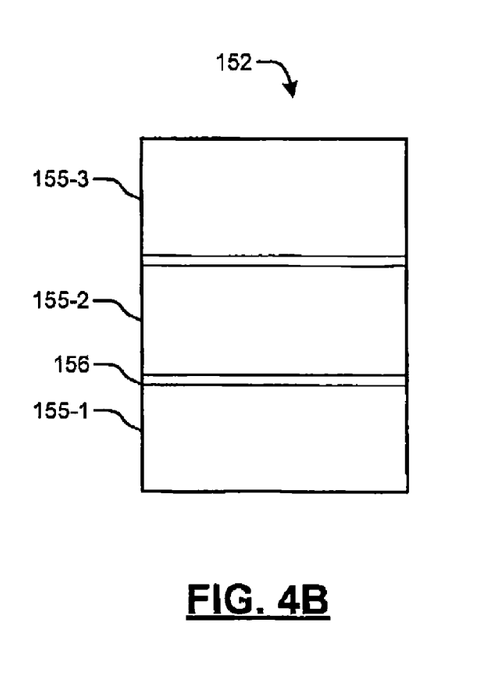
Figure 4C:
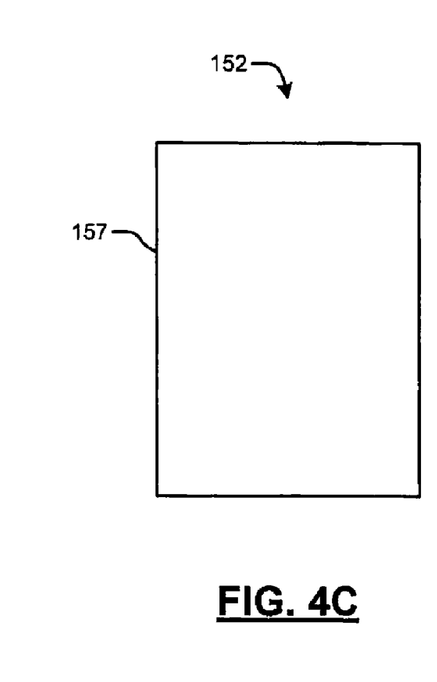

Referring to FIGS. 4A-4C, examples of electrically conductive and/or semi-conductive sides 152 of the tray 116 are illustrated. In FIG. 4A, the side 152 includes electrically conductive and/or semi-conductive areas 154-1, 154-2, . . . , and 154 N (collectively referred to as areas 154) so that each of the battery cells 20 is positioned adjacent to one of the area 154. The area 154 may be spaced apart and may not contact each other. When one or more of the battery cells 20 leaks, the respective area 154 provides current from the leaked electrolyte to the detectors 31. In FIG. 4B, groups of battery cells 20 are positioned adjacent to electrically conductive and/or semi-conductive areas 155-1, 155-2, 155-3 (referred to as areas 155), respectively. Electrically insulative areas 156 may be positioned between areas 154, 155 of FIGS. 4A and 4B, respectively. In FIG. 4C, all the cells 20 are positioned adjacent to the same electrically conductive or semi-conductive area 157. If any of the cells 20 leak, the area 157 provides current to the detector 31 that indicates the leak. For example, conductive clips may clip the sides of the tray 116 together, and the detectors 31 may detect leakage via the clips.

Figure 5A:
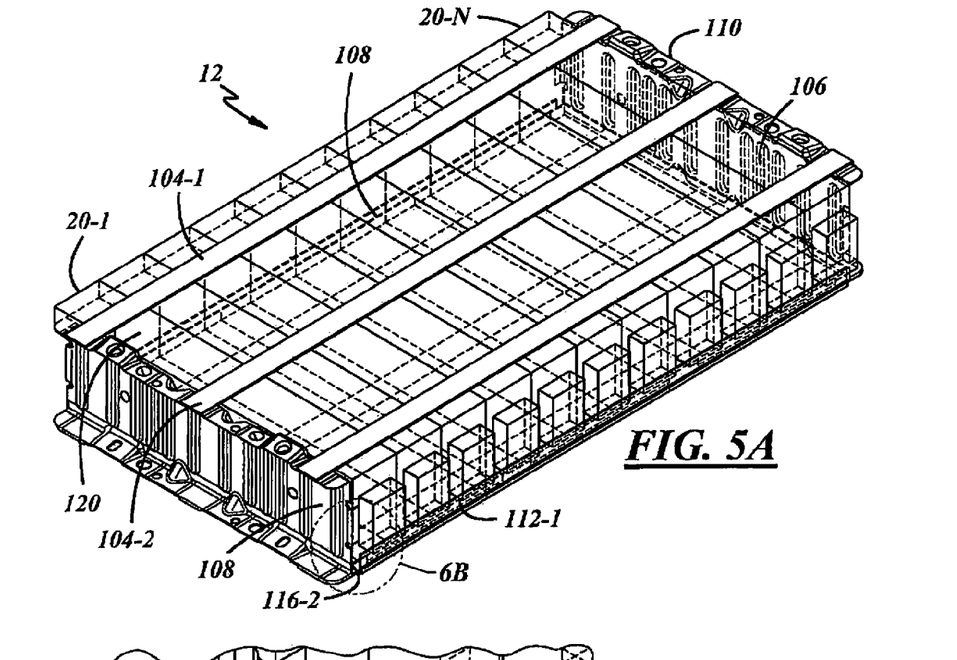
FIGS. 5A-5C are views of a battery assembly according to the present disclosure.
Figures 5B, 5C:
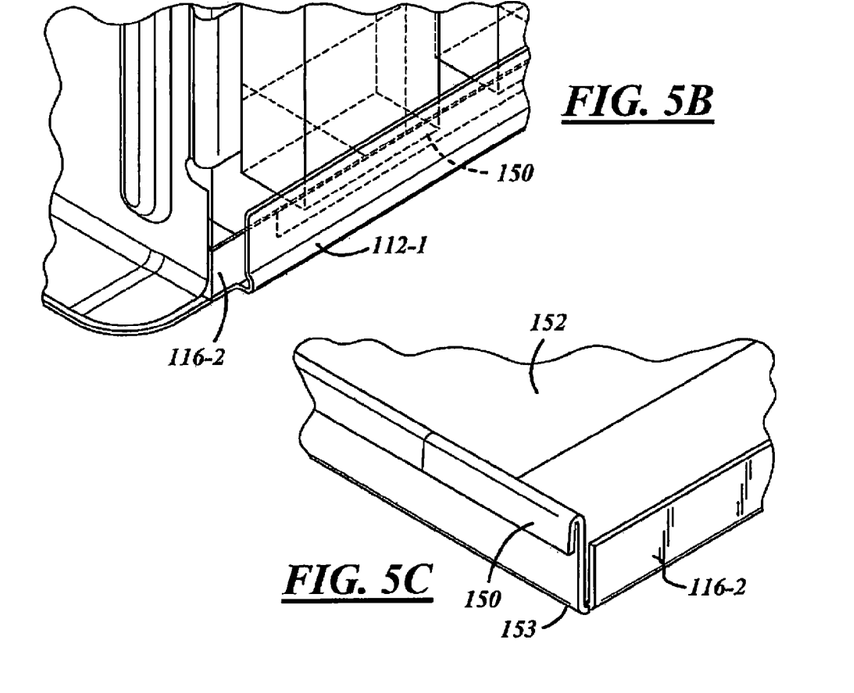

Referring now to FIGS. 5A-5C, one or more of the trays 116 may include a flange portion 150 that contacts the housing assembly 102. For example, a tray 116 may include an electrically conductive and/or semi-conductive side 152 and an insulative side 153. The battery cells 20 may be arranged adjacent to the side 152. The flange portion 150 may be arranged so that the side 152 is folded over. The housing assembly 102 may contact the portion of the side 152 that is folded over. For example, the tray 116 may be arranged to fit within the L-band 112. The battery cells 20 may be adjacent the side 152. The housing assembly 102 may be adjacent to the insulative side 153 with the exception of the side 152 that is folded over to form the flange portion 150. The detectors 31 may receive current from the L-bands 112. Further, various portions of the battery subpack 12 may be coupled together using clips, such as C-clips, that may be conductive. The detectors 31 may detect current from the clips.

Figure 6A:
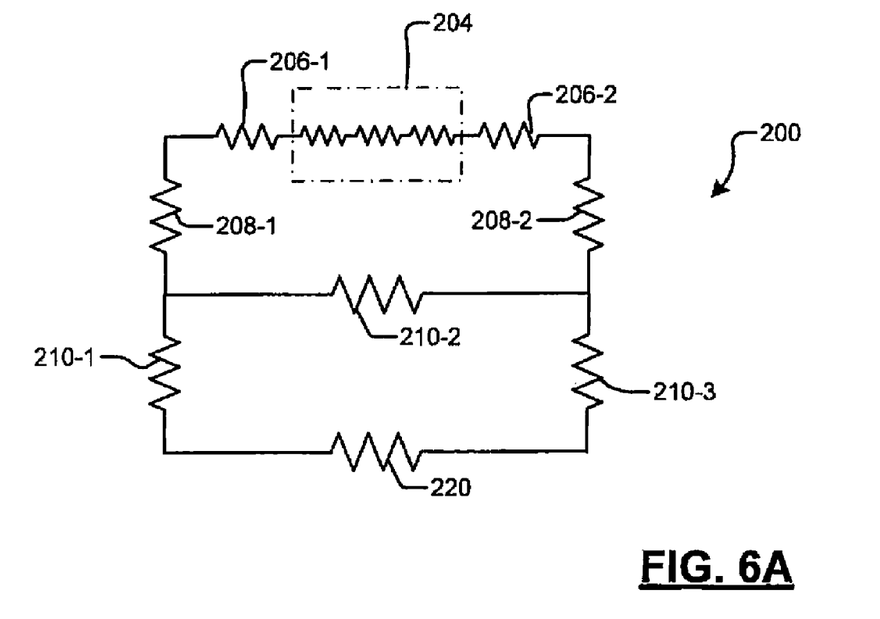
FIGS. 6A-6B are partial circuit diagrams of battery assemblies according to the present disclosure.
Figure 6B:
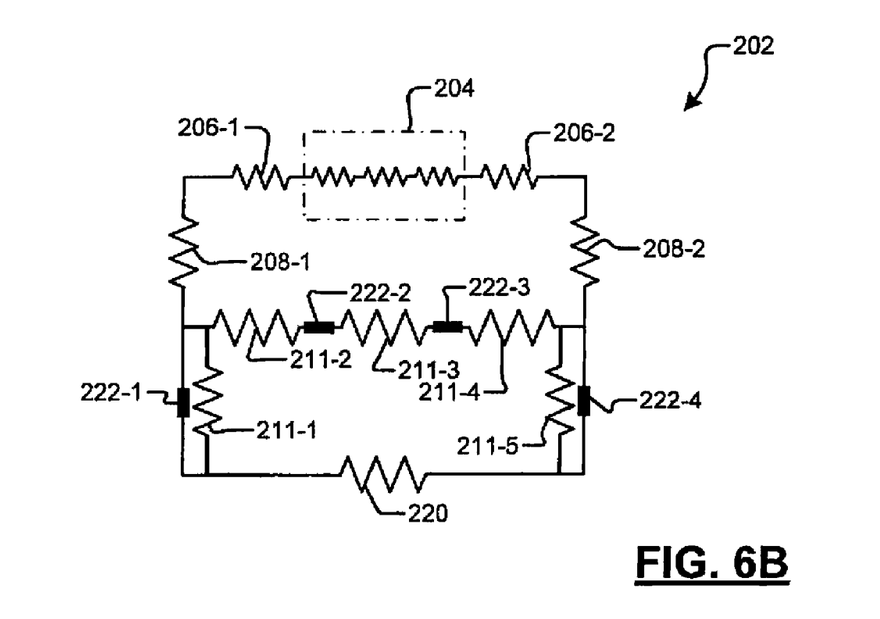

Referring now to FIGS. 6A-6B, exemplary circuit diagrams 200, 202 of the battery system 10 are illustrated. In FIG. 6A, a number of battery subpacks may leak, for example, the leakage resistances 206-1, 206-2 of two leaking batteries are shown. Battery resistance 204 for the remaining non-leaking batteries is also shown. Electrolyte from the leaking batteries provide additional electrolytic resistances 208-1, 208-2, respectively. Previously, electrolyte from multiple leaking batteries had a tendency to contact and thus either rapidly discharge the battery subpack 12 and/or cause current from the battery to flow through portions of the housing assembly 102. The present disclosure isolates the battery cells 20 via the trays 116. The trays 116 provide substantial additional resistances 210-1, 210-2, 210-3 (collectively referred to as resistances 210) that insulate the housing assembly 102. For example, the strap resistance 220 is illustrated substantially insulated from the electrolyte resistances 208-1, 208-2.

Battery resistance 204, strap resistance 220 and leakage resistances 206-1, 206-2 of leaking batteries may include, for example, low resistances, which may be in the range of $10^{-3}$ Ohms. The electrolytic resistances 208-1, 208-2 may provide moderate resistances, which may be in the range of 1 Ohm to 10 Ohms. The tray resistances 210 may provide high resistances, which may be in the range of $1^5$ to $1^6$ Ohms. In FIG. 6B, the tray resistances 211-1, 211-2, 211-3, 211-4, 211-5 (collectively referred to as resistances 211) may be interspersed with materials having even higher resistances 222-1, 222-2, 222-3, 222-4 (collectively referred to as resistances 222), which may be in the range of $1^{10}$ Ohms.

The additional resistances 222, which may correspond to the electrically insulative areas 156 of FIGS. 4A-4B, may further isolate the housing assembly 102 from the leaking battery cells. The range of resistances for materials of the conductive/semi-conductive side may be high enough to allow gradual discharge of the battery 20 and low enough to allow leakage detection via the detector 31. Generally, the higher the resistance of the material, the lower the current that is received in the detector 31. For example, resistance characteristics for the conductive/semi-conductive side may be greater than 100 K Ohm and less than 1 M Ohm.

Figure 7:
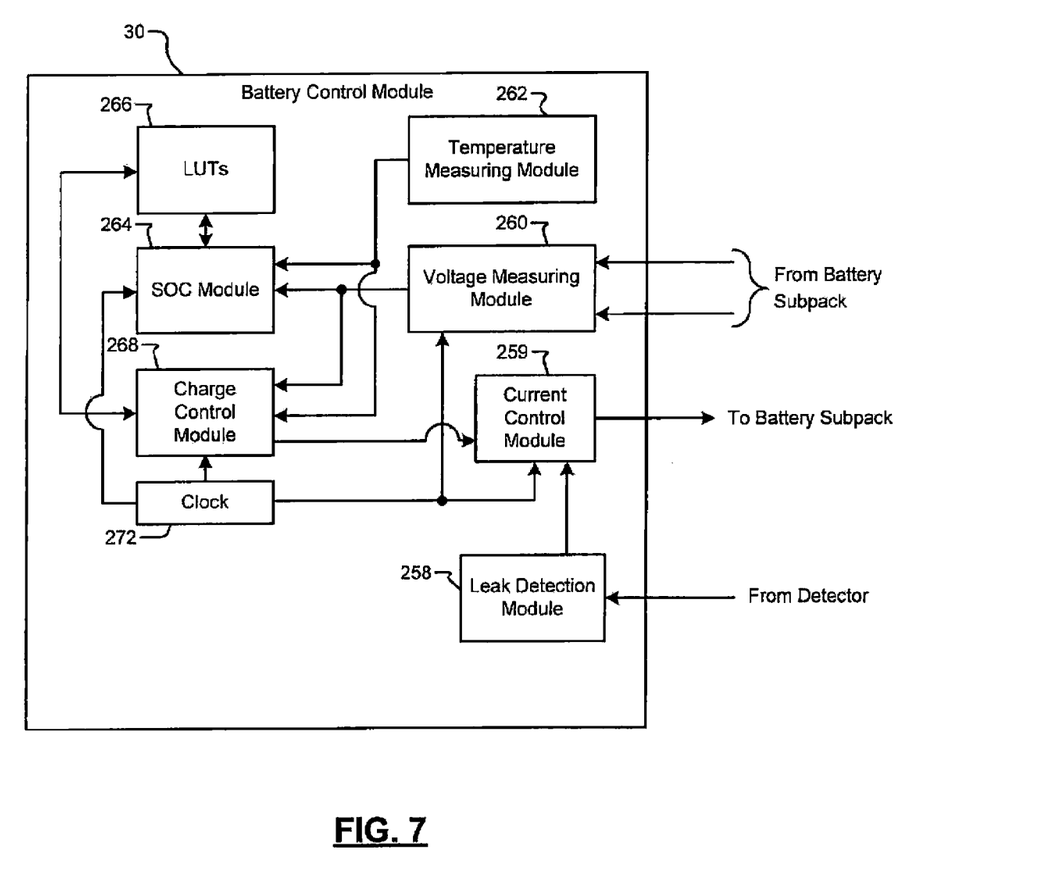
FIG. 7 is a schematic diagram of a battery control module according to the present disclosure.

Referring now to FIG. 7, each battery control module 30 may include a leak detection module 258 that receives signals from the detectors 31. A current control module 259 may regulate current in the battery cells 20 based on detector signals. For example, the current control module 259 may cut-off charging and/or discharging of the battery cells 20 based on detection of a leak. A voltage measuring module 260 may measure battery voltage of battery subpack 12.

A battery temperature measuring module 262 may measure battery temperature at within the battery subpack 12. A battery state of charge (SOC) module 264 may determine SOC of the battery subpack 12. The SOC module 264 may employ one or more lookup tables (LUTs) 266, formulas and/or other methods to determine the SOC. A charge control module 268 may determine a maximum magnitude of charging current for battery subpack 12. The current control module 259 may also limit the magnitude of the charging current through battery subpack 12 based on the determination made by charge control module 268. A clock circuit 272 may generate one or more clock signals for one or more of the modules that are included in battery control module 30.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A battery system, comprising:
a housing;
N charge storage devices within said housing; and
a first tray comprising a first sheet having a first surface and a second surface, wherein said second surface of said first tray is arranged opposite to said first surface of said first tray, wherein said first surface includes X areas transferring a first current to a current detector from electrolyte that is leaked along a surface of a first one of said N charge storage devices, and wherein said second surface insulates said housing from said electrolyte, wherein N and X are integers greater than or equal to 1.

2. The battery system of claim 1 wherein said housing comprises a conductive "L"-shaped band that communicates with said X areas and said current detector.

3. The battery system of claim 2 wherein a portion of said first surface is folded over a portion of said second surface, and wherein said "L"-shaped band communicates with said portion of said first surface.

4. The battery system of claim 1 wherein X≧N, and wherein X and N are greater than 1.

5. The battery system of claim 1 further comprising a second tray comprising a third surface and a fourth surface, wherein said fourth surface of said second tray is arranged opposite to said third surface of said second tray, wherein said third surface includes Y areas that transfer said first current from electrolyte leaked from said N charge storage devices to said current detector, and said fourth surface insulates said housing from said electrolyte, wherein Y is an integer greater than or equal to 1.

6. The battery system of claim 1 wherein said first surface comprises at least one of a conductive material and a semiconductive material.

7. The battery system of claim 1 wherein said first surface comprises one of a first polymeric material and a first composite material and said second surface comprises one of a second polymeric material and a second composite material, wherein said second surface has a higher resistance than said first surface.

8. The battery system of claim 1 wherein a first of said X areas dissipates said first current from said electrolyte from said first of said N charge storage devices over a surface area of said first of said X areas.

9. The battery system of claim 8 wherein a second of said X areas dissipates a second current from electrolyte leaked from a second of said N charge storage devices over a surface area of said second of said X areas.

10. The battery system of claim 9 wherein said first surface substantially insulates said first current from said second current.

11. The battery system of claim 9 wherein said first surface comprises a first trough that collects said electrolyte leaked from a first of said N charge storage devices and a second trough that collects said electrolyte leaked from a second of said N charge storage devices.

12. The battery system of claim 1 wherein said housing comprises a first end plate, a second end plate and straps that connect said first end plate to said second end plate, wherein said first tray is positioned adjacent to said straps, and wherein said first end plate, said second end plate and said straps are electrically conductive.

13. The battery system of claim 12 further comprising a first insulating plate positioned between said first end plate and said N charge storage devices and a second insulating plate positioned between said second end plate and said N charge storage devices.

14. The battery system of claim 1 wherein said first surface of said first tray comprises a base material that is at least one of impregnated with a semiconductor material and coated with a semiconductor material.

15. A battery system, comprising:
A plurality of battery subpacks that communicate in at least one of series and parallel, wherein each of said battery subpacks comprises:
a housing,
N charge storage devices within said housing, and
a tray comprising a rectangular portion including a first side and a second side, wherein said second side of said tray is arranged opposite to said first side of said tray, and wherein said first side includes X areas that transfer a first current from electrolyte leaked along a surface of a first one of said N charge storage devices, and wherein said second side insulates said housing from said electrolyte, wherein N and X are integers greater than or equal to 1;
at least one current detector that generates detection signals based on said first current; and
a control module that selectively controls each of said plurality of battery subpacks based on said detection signals,
wherein at least one of said housings comprises a conductive "L"-shaped band that communicates with said X areas and said at least one current detector.

16. The battery system of claim 15 wherein a portion of said first side is folded over a portion of said second side, and wherein said "L"-shaped band communicates with said portion of said first side.

17. The battery system of claim 15 wherein a first of said X areas dissipates said first current from said electrolyte from said first of said N charge storage devices over a surface area of said first of said X areas, and
wherein a second of said X areas dissipates a second current from electrolyte leaked from a second of said N charge storage devices over a surface area of said second of said X areas, wherein said first side substantially insulates said first current from said second current.

18. The battery system of claim 15 wherein each of said housings comprise a first end plate, a second end plate and straps that connect said first end plate to said second end plate, wherein said tray is positioned adjacent to said straps, and wherein said first end plate, said second end plate and said straps are electrically conductive.

19. The battery system of claim 18 wherein each battery subpack further comprises a first insulating plate positioned between said first end plate and said N charge storage devices and a second insulating plate positioned between said second end plate and said N charge storage devices.

20. The battery system of claim 15 wherein for each battery subpack, said first side of said tray comprises a base material that is at least one of impregnated with a semiconductor material and coated with a semiconductor material.

21. A battery system, comprising:
   a plurality of battery subpacks that communicate in at least one of series and parallel, wherein each of said battery subpacks comprises:
   a housing,
   N charge storage devices within said housing, and
   a tray comprising a first side that includes X areas that transfer a first current from electrolyte leaked along a surface of a first one of said N charge storage devices, and a second side that insulates said housing from said electrolyte, wherein N and X are integers greater than or equal to 1;
   at least one current detector that generates detection signals based on said first current; and
   a control module that selectively controls each of said plurality of battery subpacks based on said detection signals,
   wherein each battery subpack comprises conductive clips that clip the first side and the second side of the tray together at one or more of the X areas.

* * * * *